US008397988B1

(12) United States Patent
Zuili

(10) Patent No.: US 8,397,988 B1
(45) Date of Patent: Mar. 19, 2013

(54) METHOD AND SYSTEM FOR SECURING A TRANSACTION USING A CARD GENERATOR, A RFID GENERATOR, AND A CHALLENGE RESPONSE PROTOCOL

(75) Inventor: Patrick Joseph Zuili, Boca Raton, FL (US)

(73) Assignee: Britesmart LLC, Boca Raton, FL (US)

( * ) Notice: Subject to any disclaimer, the term of this patent is extended or adjusted under 35 U.S.C. 154(b) by 437 days.

(21) Appl. No.: 12/557,762

(22) Filed: Sep. 11, 2009

Related U.S. Application Data

(63) Continuation-in-part of application No. 11/460,975, filed on Jul. 29, 2006, now Pat. No. 7,591,425, which is a continuation of application No. 10/215,888, filed on Aug. 9, 2002, now Pat. No. 7,083,090.

(51) Int. Cl.
*G06K 15/00* (2006.01)
(52) U.S. Cl. ...................................................... 235/383
(58) Field of Classification Search .................. 235/380, 235/382, 492
See application file for complete search history.

(56) References Cited

U.S. PATENT DOCUMENTS

| 7,278,571 | B2* | 10/2007 | Schmidtberg et al. | 235/383 |
| 7,597,250 | B2* | 10/2009 | Finn | 235/380 |
| 2006/0272007 | A1* | 11/2006 | Sweeley et al. | 726/2 |
| 2008/0169350 | A1* | 7/2008 | Audebert et al. | 235/492 |

* cited by examiner

*Primary Examiner* — Seung Lee
(74) *Attorney, Agent, or Firm* — John R. Kasha; Kasha Law LLC

(57) ABSTRACT

A system for securing a transaction comprises an authentication unit capable of processing an input and generating a dynamic card transaction code/virtual card code which is valid for a single transaction upon authentication; and a RFID generator capable of generating at least a dynamic RFID key for a predefined limited time period by using the dynamic card transaction code for the single transaction. The authentication of the input is performed locally with the authentication unit through an encrypted and unique RFID communication between the authentication unit and a third party by using a challenge response protocol. The authentication unit is capable of working alone and as a plug-in with at least any one of a personal digital assistant (PDA), a hand-held remote control, a cellular telephone, a fax machine, and a printer is used for securing the transaction.

40 Claims, 12 Drawing Sheets

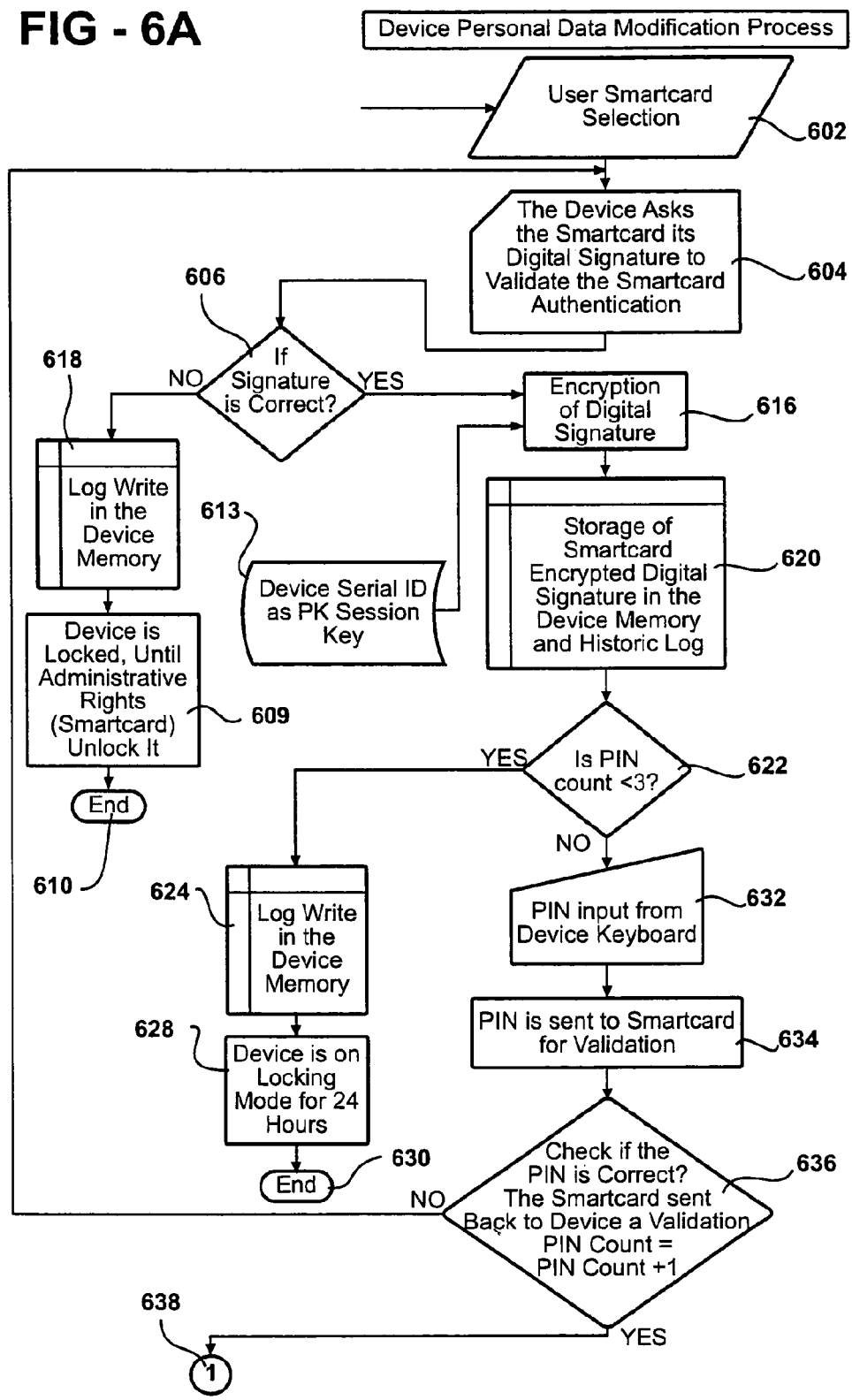

METHOD AND SYSTEM FOR SECURING A TRANSACTION USING A CARD GENERATOR, A RFID GENERATOR, AND A CHALLENGE RESPONSE PROTOCOL

CROSS-REFERENCE TO RELATED APPLICATION

This application is a continuation-in-part of prior U.S. patent application Ser. No. 11/460,975, filed on Jul. 29, 2006, now U.S. Pat. No. 7,591,425, which is a continuation of U.S. patent application Ser. No. 10/215,888, filed on Aug. 9, 2002, now U.S. Pat. No. 7,083,090, the content of all of the above is incorporated herein by reference.

FIELD OF THE INVENTION

This invention relates generally to authentication and authorization systems and, in particular, to a system and methods of performing a local authentication of instruments and requests through a local biometric authentication device with a high degree of transaction security.

BACKGROUND OF THE INVENTION

In the modern world of networked transaction processing, authentication is only way to validate requests for financial services and other demands with any degree of security or data integrity. However, even with the current widespread use of encryption, security codes and personal identification numbers (PINs), existing systems are subject to various types of attacks or hacking. Such security breaches may, for example, be carried out through keyboard hooks and other data-sniffing techniques, magnetic card duplicators, smart-card emulators, and so forth.

At the same, the number of electronic devices applicable to transaction and data processing has grown, including not only dedicated terminals adapted for such uses, but general-purpose computing machinery, personal and digital assistants (PDAs), laptop, palmtop and notebook computers.

Existing authentication devices are deeply connected to computers or other devices such as cable/satellite decoders to validate a particular transaction. As such, these devices represent a single point of attack for hackers who can emulate the authentication device, hook communication between the device and the software stored inside the "computer." or even record and play communication packets.

To prevent such activities, the industry is working on protocols to enable these devices to operate securely. But protocols have their own weaknesses in the sense that when they are implemented and successfully attacked, patches may become available for widespread use on internet for free.

The efforts have been made to provide system for securing a transaction by using RFID keys, but till today none of the existing system provides means for securing a transaction in a temper proof. If a hacker has access to the server that contains name and credit cards numbers of clients or citizen with social security numbers the damages can be huge. The hacker can take hold of millions of fingerprints or biometric data and once citizen's biometric input is in the hand of the mafia, citizen can never being able to replace his biometric characteristics once the mafia stole his biometric fingerprints representations.

Most of the existing systems have opted to send card holder's biometric characteristics to a remote server which is doing the authentication. In this particular case what would happen to users's biometric data and/or templates, when their biometric data has been stolen? How to repudiate biometric information that is correct but tampered or hacked? Most of current systems are using remote server to authenticate either a buyer and this based on any of his biometric input characteristics or a citizen entering inside his own country or a citizen entering a foreign country. The citizen will have a smart card with his biometric characteristics and when he enters the foreign country he need to enter an appropriate biometric input, the smart card reader will authenticate the person without the need to 'ship' the biometric data to a server somewhere in the some part of the world without the guarantee and assurance that if the server is tampered that server will not release the citizen's fingerprint or voice print or iris scan or signature or palm or any of biometric input not being stolen. In fact it is highly likely that the citizen's biometric input could be tampered with what is commonly used either by governments or merchants.

Accordingly, the need remains for system and methods which allows the use of these alternative devices, including portable devices, while, at the same time, provides a level of security, scalability and transparency in conjunction with existing infrastructures which is at least as good, and preferably much higher, than systems currently in use.

SUMMARY OF THE INVENTION

In view of the disadvantages inherent in the existing authentication devices and methods, the general purpose of the present invention is to provide an effective system and methods for securing a transaction by authenticating an input at local level or at the authentication unit or at the card reader so that card holder's privacy remained safe, to include advantages of the existing authentication devices, and to overcome the drawbacks inherent therein.

In one aspect, the present invention provides a system for securing a transaction, the system comprises: an authentication unit capable of processing an input, the authentication unit is capable of generating a dynamic card transaction code valid for a single transaction and a RFID generator capable of generating at least a dynamic RFID key for a predefined limited time period by using the dynamic card transaction code for the single transaction. The dynamic card transaction code includes a generic card code, a virtual card code, a temporary card code and the like, wherein the code includes a number, a character, symbols. The authentication of the input is performed locally with the authentication unit through an encrypted and unique RIFD communication between the authentication unit and a third party by using a challenge response protocol. The authentication unit may be used alone or as a plug-in to another device such as a PDA, cell phone, or remote control In another aspect, the present invention provides a method for securing a transaction, the method comprises the steps of: receiving an input from a user, authenticating the input by an authentication unit, wherein the input is authenticated by pairing the input stored in the authentication unit with the input extracted from the user, generating a dynamic card transaction code for a single transaction upon authentication of the input, generating a dynamic RFID key for the single transaction by using the dynamic card transaction code, communicating the dynamic RFID key to a third party for validating the transaction by using a challenge response protocol, and communicating an ID of the transaction to the third party by the RFID generator upon validation of the transaction. The transaction is authenticated locally with the authentication unit with the third party by using at least one of the dynamic RFID key, the dynamic card transaction code, and a challenge response protocol.

In another aspect, the present invention provides a method of authenticating a transaction, the method comprises the steps of: obtaining the biometric characteristics input locally with the authentication unit of the user from the biometric reader and biometric sensor, comparing the biometric characteristics input with the stored biometric characteristics and biometric templates to authenticate the transaction, generating a dynamic card transaction code for a single transaction by the authentication unit if the biometric characteristics input match with the stored biometric characteristics, generating a dynamic RFID key for the single transaction by using the dynamic card transaction code, sending the encrypted dynamic RFID key to the third party through the authenticating unit using a challenge response protocol, wherein the atomic time is used as a serialization and challenge response protocol variable, receiving a confirmation for validating the transaction by the third party at the authentication unit, and communicating an ID of the transaction to the third party by the RFID generator upon validation of the transaction.

These together with other aspects of the present invention, along with the various features of novelty that characterize the invention, are pointed out with particularity in the claims annexed hereto and forming a part of this disclosure. For a better understanding of the present invention, its operating advantages, and the specific objects attained by its uses, reference should be made to the accompanying drawings and descriptive matter in which, there are illustrated exemplary embodiments of the present invention.

BRIEF DESCRIPTION OF THE DRAWINGS

The advantages and features of the present invention will become better understood with reference to the following more detailed description and claims taken in conjunction with the accompanying drawings, wherein:

FIG. 6A is a flow diagram which illustrates a exemplary process associated with personal data modification utilizing the authentication unit according to the invention;

Like reference numerals refer to like parts throughout several views of the drawings of the present invention.

DETAILED DESCRIPTION OF THE INVENTION

In view of the disadvantages inherent in the existing authentication devices and methods, the general purpose of the present invention is to provide an effective system and methods for securing a transaction by authenticating an input at local level through an authentication unit, to include advantages of the existing authentication devices, and to overcome the drawbacks inherent therein.

For a thorough understanding of the present invention, refer to the following detailed description, including the appended claims, in connection with the above-described drawings. Although, the present invention is described in connection with exemplary embodiments, the invention is not intended to be limited to the specific forms set forth herein. On the contrary, it is intended to cover such alternatives, modifications, and equivalents as can be reasonably included within the scope of the invention as defined by the appended claims In the following description, for purposes of explanation, numerous specific details are set forth in order to provide a thorough understanding of the present invention. It will be apparent, however, to one skilled in the art that the present invention may be practiced without these specific details.

As used herein, the terms 'a', 'an', 'at least' do not denote a limitation of quantity, but rather denote the presence of at least one of the referenced item, and 'a plurality' denotes the presence of more than one referenced items.

Figure 1:
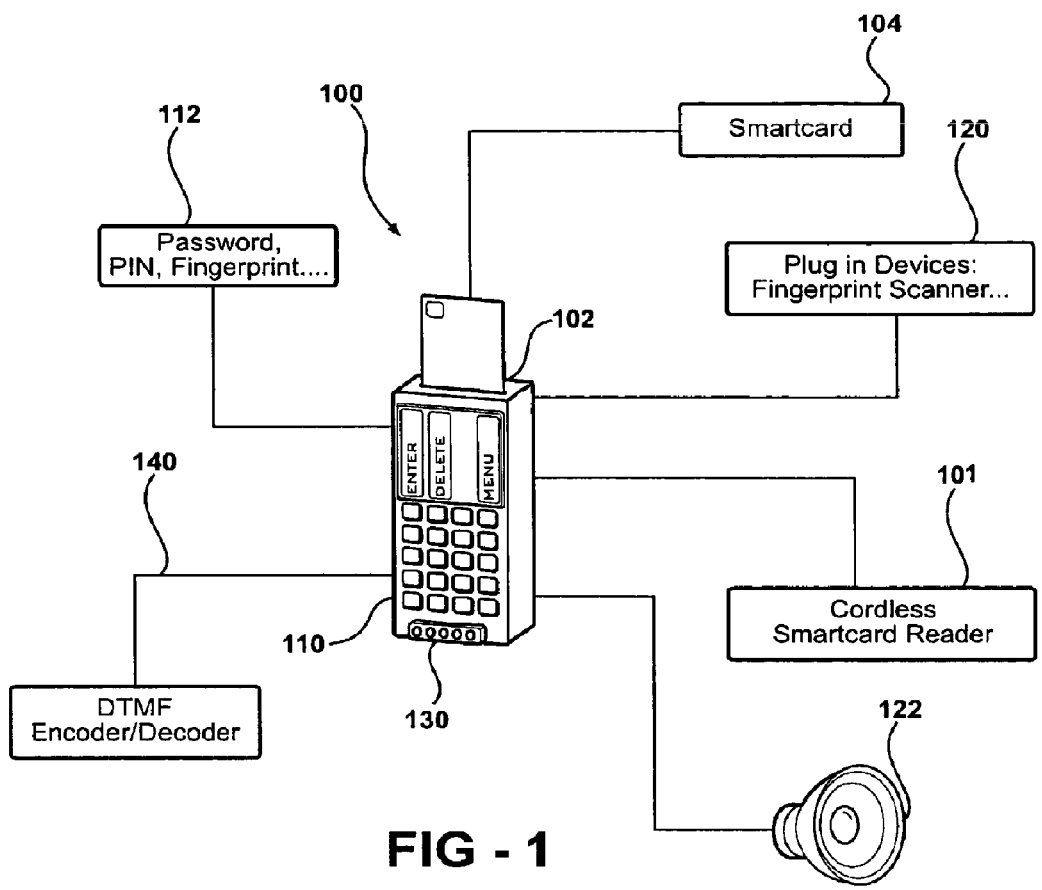
FIG. 1 is a drawing of a portable authentication unit, according to an exemplary embodiment of the present invention.

Now making reference to the drawings, FIG. 1 illustrates the exemplary embodiment of the present invention in the form of a portable authentication unit (also referred to as 'smart-cards reader device' or 'device'), indicated generally at 100. The authentication unit includes slot(s) 102 to receive the card 104, and a keyboard 110 enabling passwords, personal identification codes, and the like to be input by a user. It will be appreciated that although a generic "smart-card" is shown in the figure, in the exemplary embodiment, the unit includes its own central-processing unit for transaction management and input/output capability for reading and writing information to various other types of cards including magnetic cards, optical cards, EAROM cards, random-access memory (RAM) cards, and read-on memory (ROM) cards. Nor is the unit limited to the use of a single type of smart-card or other card, since in alternative embodiments, the same unit may recognize multiple card owners and users.

An interface 120 may be provided for connection to a plug-in type of biometric device such as a fingerprint scanner or other input. Optionally, in the alternative, such plug-in devices may be integrated directly into the apparatus 100. Indeed, although speaker 122 is shown as being remote from the body of the unit, in the exemplary embodiment the speaker is integral.

Further included in the system 100 is a light sensor 130, described in further detail below, and an output 140 to deliver an encoded signal associated with authentication. As shown in the figure, in the exemplary embodiment, the signal is a dual-tone, multi-format (DTMF) signal.

As discussed elsewhere herein, the authentication unit incorporates numerous mechanisms to ensure the highest degree of security against hacking and other forms of security attacks. For example, in the exemplary embodiment, the authentication unit is deactivated in the event that an incorrect PIN is entered more than a predetermined number of times, which may be adjustable from one instance or more. The system is also preferably capable of sensing and guarding against physical, electrical and other forms of corruption, including sensors which detect forces sufficient to break the authentication unit or other forms of misconduct.

Other optional capabilities to guard against intrusion include mechanical and electronic means for preventing the extraction of the card if the PIN/password, fingerprint or other authorization does not correspond to the authorized user. In an exemplary embodiment, the present invention provides access control over a plurality of mechanical and electronic means, in the event of these other attempts to gain unauthorized access to the unit or components thereof, data stored within the authentication unit, whether volatile, or read-only or encrypted, as well as smart-card or other types of card information may automatically be erased.

In addition to other information associated with a particular instance or transactions, the unit may be equipped with sufficient memory capability to additionally store other types of information in encrypted form, including personal data of the owner of the unit and/or card, including, but not limited to, address, billing address, zip code, social security number, e-mails, web addresses, and so forth.

Given the extent to which certain user information is compiled, encrypted and stored by the authentication unit, an optional feature is the ability to permit new users, as well as the deactivation of other users based upon the receipt of appropriate commands. The activities of particular users may also be stored and time-stamped, for later readout, either directly through the authentication unit or by way of remote access.

The reader may also be automatically updated through the use of codes received on a periodic or occasional example, for example, at the time of each transaction. Such auto-update capabilities may be encrypted with session key/private key/reader public key/or time based on atomic synchronization plus a counter, for example, used to verify reader research, or otherwise used to update algorithms or data stored in memory. Such information may be received optically or through the use of known (DTMF) or future standard protocols such as Bluetooth technology and the like.

Figure 2:
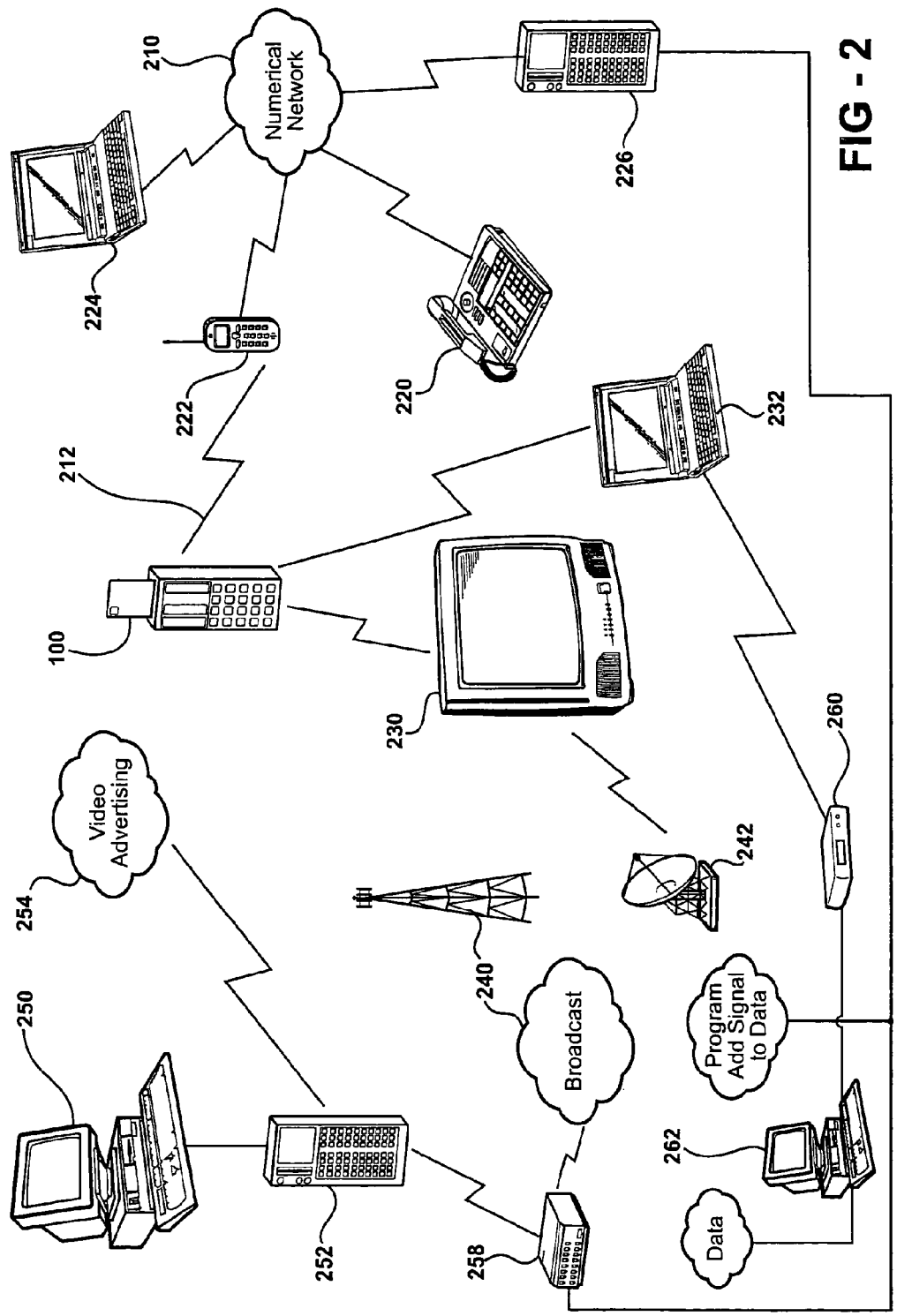
FIG. 2 is a drawing which illustrates important aspects of an infrastructure to which the authentication unit of FIG. 1 is applicable, according to an exemplary embodiment of the present invention.

FIG. 2 is a diagram which illustrates the various environments in which the system 100 operates. Broadly, the system is able to generate a request for an authentication through a wide variety of devices, and receive verification through numerous other diverse types as well. In FIG. 2, any device capable of connection to telecommunications infrastructure 210 may receive a request for authentication since, in the exemplary embodiment; such requests are generated utilizing the well established dual tone multi-frequency (DTMF) encoder/decoder signal 212. Such devices would include, standard wire telephone 220, cellular telephone 222, any network computer 224 or a proprietary or public network 226 operated to collect and aggregate viewer payments, for example.

In terms of the authentication signal, any television 230 or network computer 232 may participate. Television 230 may, in turn, receive input from any applicable transmission medium, including broadcast 240, satellite 242, and so forth. Equipment originating the information may be derived from a workstation 250 or any other wired or wireless/network computing device. A network and advertising module 252 may be used to integrate video advertising 254, to add the light signal or DTMF signal sensed by sensor 130 of the system 100. The unit 258 may be used to integrate the light signal to broadcast on vertical blanking, MPEG or other protocols to television or monitor 230. Indeed, through the use of a connection between the proprietary or public network device 226 and module 258, a programming signal may be added to the broadcast verification signal, resulting in a comprehensive data feedback loop.

With respect to computer 232, any device capable of connection to the internet 260 or other infrastructure may be used. Devices such as 262 connected to the internet 260 may include the appropriate data enabling the verification signal to be routed from point-to-point, ultimately leading to verification at system 100.

The system 100, though shown as an independent unit, may be integrated to any form of existing device, be it a personal digital assistant (PDA), cellular telephone, or even hand-held remote control, a headphone, and so forth. In some of these applications, including the remote control, an additional light sensor may not be necessary, since information used to authenticate may already be provided in the form of an existing infrared module or DTMF protocol associated with any one of a variety of entertainment devices (TV, VCR, tape, DVD, CD audio). In these cases, the additional hardware required by the present invention would include the DTMF encoder/decoder, and smartcard reader to permit the acknowledgement of a transaction.

The data entered into the system 100 may be encrypted or non-encrypted when received. If an encryption mechanism is used, it may be of any type, including public or session key. For example, the name, social security number, or other type of information may be used, depending upon the level of security needed, a technique known as identity-based encryption (IBE).

As discussed above, the authentication data may be delivered through any type of computer monitor, television, liquid-crystal display (LCD), light-emitting diode or other emitter, operative to generate a high-contrast signal to be received and interpreted by the system 100. Software application would be used to generate signals which are transcoded from an analog or other format into a binary, hexadecimal or other digital scheme to enhance reception.

In conjunction with the received optical signal, the processor and system 100 preferably further requests additional authentication data through some form of user interface, including the keypad (personal identification number or PIN), biometric authentication, such as a fingerprint, or other applicable security mechanism.

Once received and stored in internal or external memory, the information is appropriately decrypted and/or re-encrypted, and sent to any external device (microphone, standard telephone, cellular phone, and so forth) as a dual-tone (DTMF, AFSK, or PL) signal for transactional purposes.

The system 100 may operate independently, or as discussed above, may be added a plug-in to an existing device such as a PDA, phone computer, cellular phone, remote control television, keyless entry system, and so forth. Broadly, the interface device is coupled to an optoelectronic device incorporating reader of one or multiple smartcards for the acquisition of optical messages, and a dual-tone multi-decoder (DTMF, AFSK, PL) to send back authentication information, including payment validation, authorization, key opening or any other operations.

The system 100 includes sufficient memory capabilities, whether internal or on the card or other media, as appropriate to perform desired functions on behalf of a user. Depending upon the embodiment, the unit may store private keys, public keys on its own memory, or on the smartcard, in encrypted or unencrypted form, such that when the appropriate password/passphrase is typed on the smartcard reader, a session key (based on IBE or conventional PKI) is provided to a third party (i.e., computer or decoder) to permit encryption or decryption.

In contrast to existing solutions the universal smartcard reader of the present invention is never directly connected to the third party, enabling it to act as a closed box under external attack. This novel approach therefore solves a complex issue concerning the storage of keys (PKI) on a third party (computers in public area, for example), as well as numerous password recovery techniques used to sniff a keyboard to recover passwords and file hacking to recover private keys files.

Figure 3:
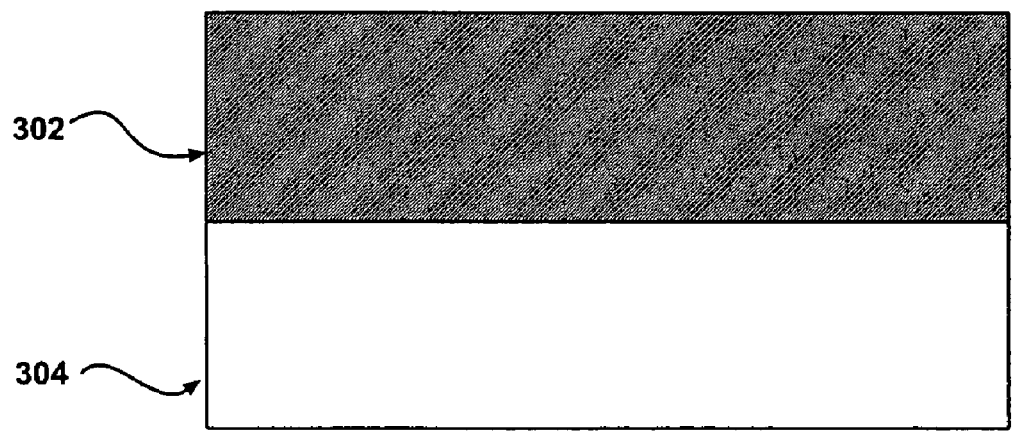
FIG. 3 is a drawing which shows an optical signal associated with the authentication procedure, according to an exemplary embodiment of the present invention.

Now making reference to FIG. 3, the exemplary embodiment uses a high-contrast black and white image (or any other appropriate color or high-contrast arrangement from an LED, flashing LCD screen, or highly pixelized optical signal). For example, a screen may be used, wherein for example; a black upper signal 302 becomes white, while the black signal 304 becomes black, with the timeframe between the two signals establishing a parity or check sum. In the system 100, an electronic scanning sensor is used including optics which permits the recognition of the black and white images (or other appropriate signal), enabling the smartcard reader data to become available for authentication purposes.

The optics used to interpret the signal may be of various forms, including the use of two lenses interposed between an outer diaphragm and a sensor. For example, the lenses may use a revolving symmetrical lens, which the useful part of which is convex, in conjunction with a cylindrical lens which does not create any deflection in a plane parallel to the optical plane. Instead, the optical input is convergent in a plane perpendicular to the parallel plane once received, facilitating translation into numeric, hexadecimal, binary or other digital signaling.

After the smartcard and/or reader performs appropriate public key authentications and validation of digital signature, the encrypted data is sent back to the DTMF encoder/decoder, enabling the phone, computing device or other unit to validate the authentication transaction. In terms of security, each transaction uses its own encrypted counter with signals that are different to prevent recording thanks to the usage of atomic clock component at the synchronization level. Within the reader 100, the software is preferably stored in an obfuscated manner, with each module being preferably software encrypted and decrypted and re-encrypted after usage using a unique process, with new session's keys being transmitted to prevent disassembly or decompilation of the software or portions thereof. Sensors within the unit may be used to detect excessive use of heat or power, representing some form of misconduct which would be reported during the next transaction with all information needed to prevent further usage.

The system 100 preferably includes its own liquid crystal display, facilitating the readout of certain information, such as authorization numbers, payment authorization, serialization, or data regarding check payment or Visa/MasterCard/American Express authorization numbers. Such information would be linked to an amount of purchase or details on an item order and paid once the bank has issued an authorization on the transaction.

Figure 4A:
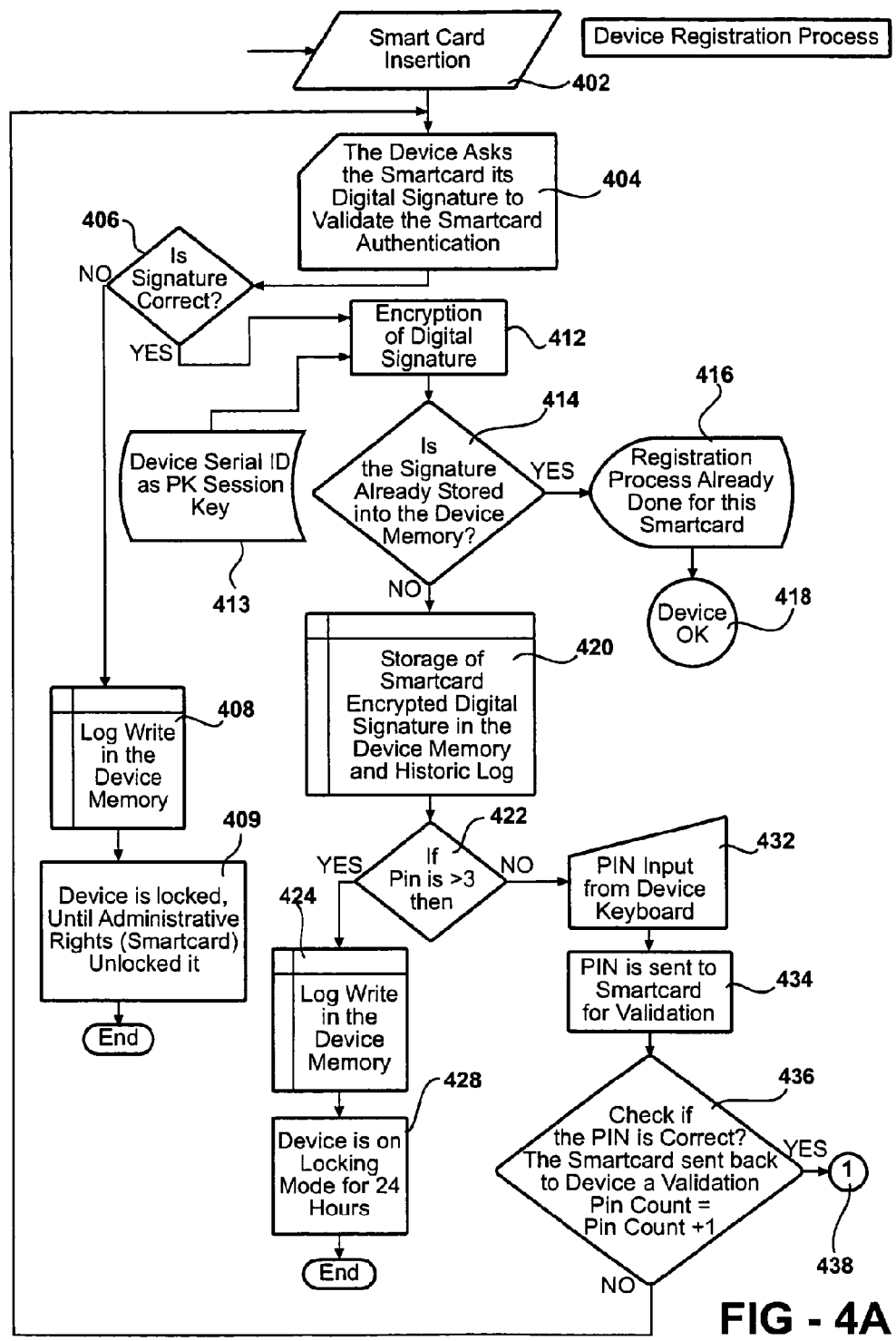
FIG. 4A is a flow diagram showing the first portion of a authentication unit registration process, according to an exemplary embodiment of the present invention.
Figure 4B:
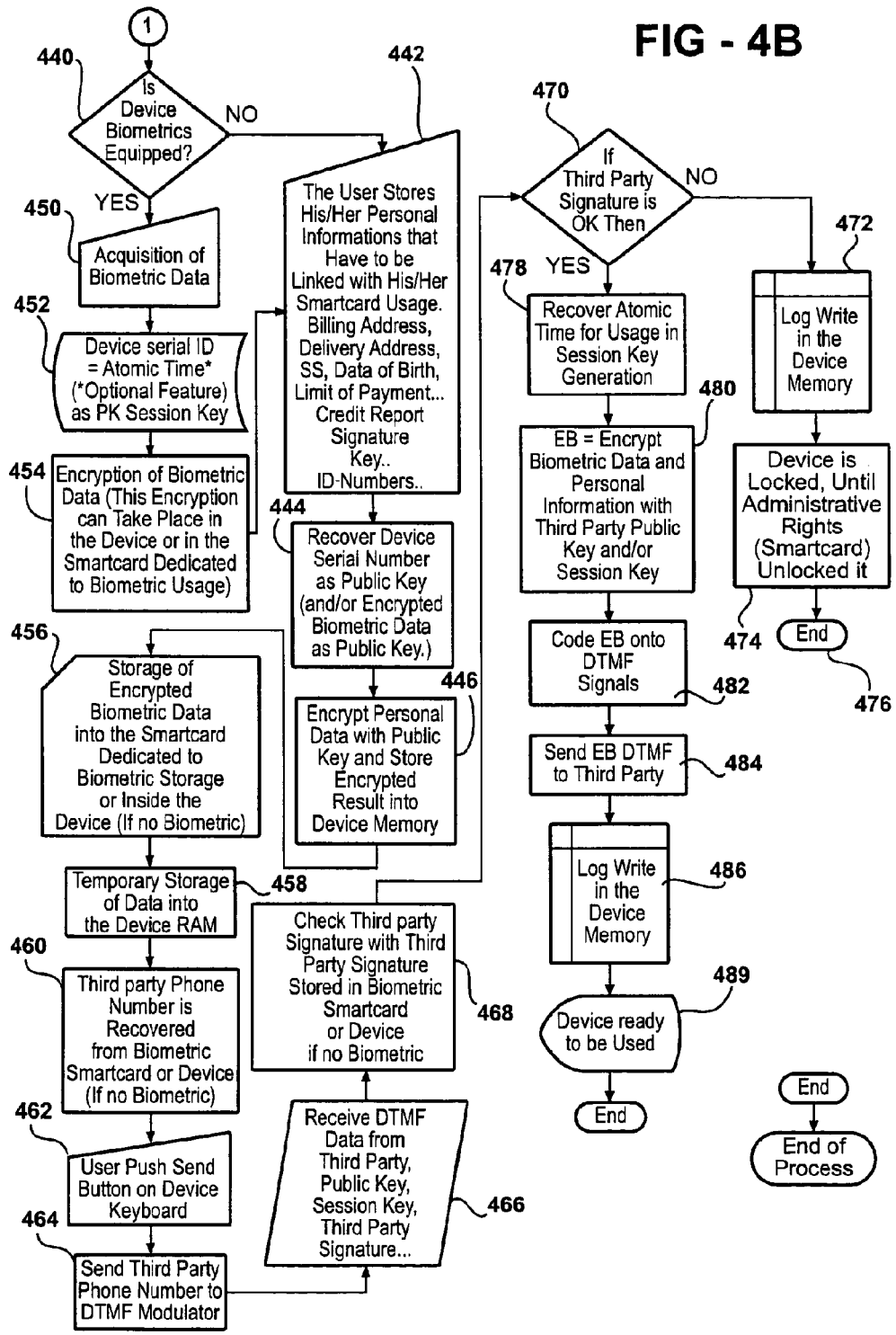
FIG. 4B is a flow diagram which illustrates the remaining portion of the authentication unit registration process, according to an exemplary embodiment of the present invention.

FIG. 4A is a flow diagram showing the first portion of an exemplary device registration process according to the present invention. FIG. 4B is a flow diagram which illustrates the remaining portion of the exemplary device registration process. The procedure commences with the insertion of the smartcard at 402. At block 404, the device interrogates the smartcard, comparing the digital signature in order to validate the authentication procedure. If the signature is correct, block 406, encryption of the digital signature proceeds at block 412. If the signature is not correct, an entry is made into the authentication unit memory at 408, and, in the exemplary embodiment, the authentication unit is frozen in terms of operation until an authorized user unlocks the authentication unit at 409, and the process ends at 410.

The encryption of the digital signature at block 412 preferably uses the device's serial identification/session key derived at block 413. At block 414, a query is made to determine if the signature has previously been stored in the authentication unit memory. If it has, the registration process has already been completed for this smartcard (block 416), and the authentication unit is authenticated at 418. If, however, the signature has not been previously been stored, storage of an encrypted digital signature into the authentication unit memory history log occurs at 420.

At block 422, a query is made to determine how many times the Personal Identification Number (PIN) has been entered into the authentication unit. If, in this example, it is greater than three, an entry is made into the authentication unit memory at 424, and the authentication unit is locked out for a predetermined period of time, such as 24 hours, the process ends at 430. Optionally this time information (current time plus 24 hours) can be stored encrypted with a session key generated thru IBE (public key or session keys) and compared (encrypted with current atomic time) to prevent time hacking of the authentication unit. If fewer attempted PINS have been entered, a PIN is entered from the keyboard at 432 sent to the smartcard for validation at 434. A test is made at 436 to determine if the PIN is correct. If it is not, the process essentially starts over. If the PIN is correct, however, query is made at 440 to determine if the authentication unit is biometrics equipped. If so, the biometric data are acquired at block 450. If not, the user stores personal information that will be linked to smartcard usage at block 442. The authentication unit serial number is recovered at 444, either as a public key and/or encrypted biometric data in the form of a public key. At 446, the encrypted personal data and public key are stored in the authentication unit memory. At block 452, having acquired biometric data at 450, the authentication unit serial ID code and optional atomic time are used as a session key. At block 454 the biometric data are encrypted. This encryption may occur in the authentication unit or in a smartcard dedicated to biometric usage, and process passes to block 442. The storage of the encrypted biometric data into the smartcard occurs at block 456. This may occur as permanent storage in some form of non-volatile memory or, alternatively, temporary storage may be transferred into random-access memory (RAM), at 458.

Optionally, a third-party phone number may be recovered from the smartcard if, for example, biometric data is unavailable. At 462, the user pushes the SEND button on the authentication unit keyboard, causing a third party number to be sent via DTMF modulation or the other schemes disclosed herein. The DTMF data is received from the third party, along with public key session and other information at 466. At block 468, the third party signature is compared to the third party signature or biometric information stored on the card. At 470, a check is made to determine whether the third party signature is authentic. If not, an entry is logged into the memory of the authentication unit at 472, and the authentication unit is locked until administrative personnel are called upon to unlock it with the appropriate private key. The process ends at 476.

At block 478, atomic time is recovered for usage in session key generation. At 480, the biometric and/or personal information with third-party public key and/or session key are encrypted at 480 (EB), and the encoded EB information is transmitted via DTMF or other appropriate signaling at 482. In particular, at 484, the EB is transmitted to a third-party, with a log being entered into the authentication unit memory. This completes the registration process, with the authentication unit being ready to use at 488, and terminating at 490.

Figure 5A:
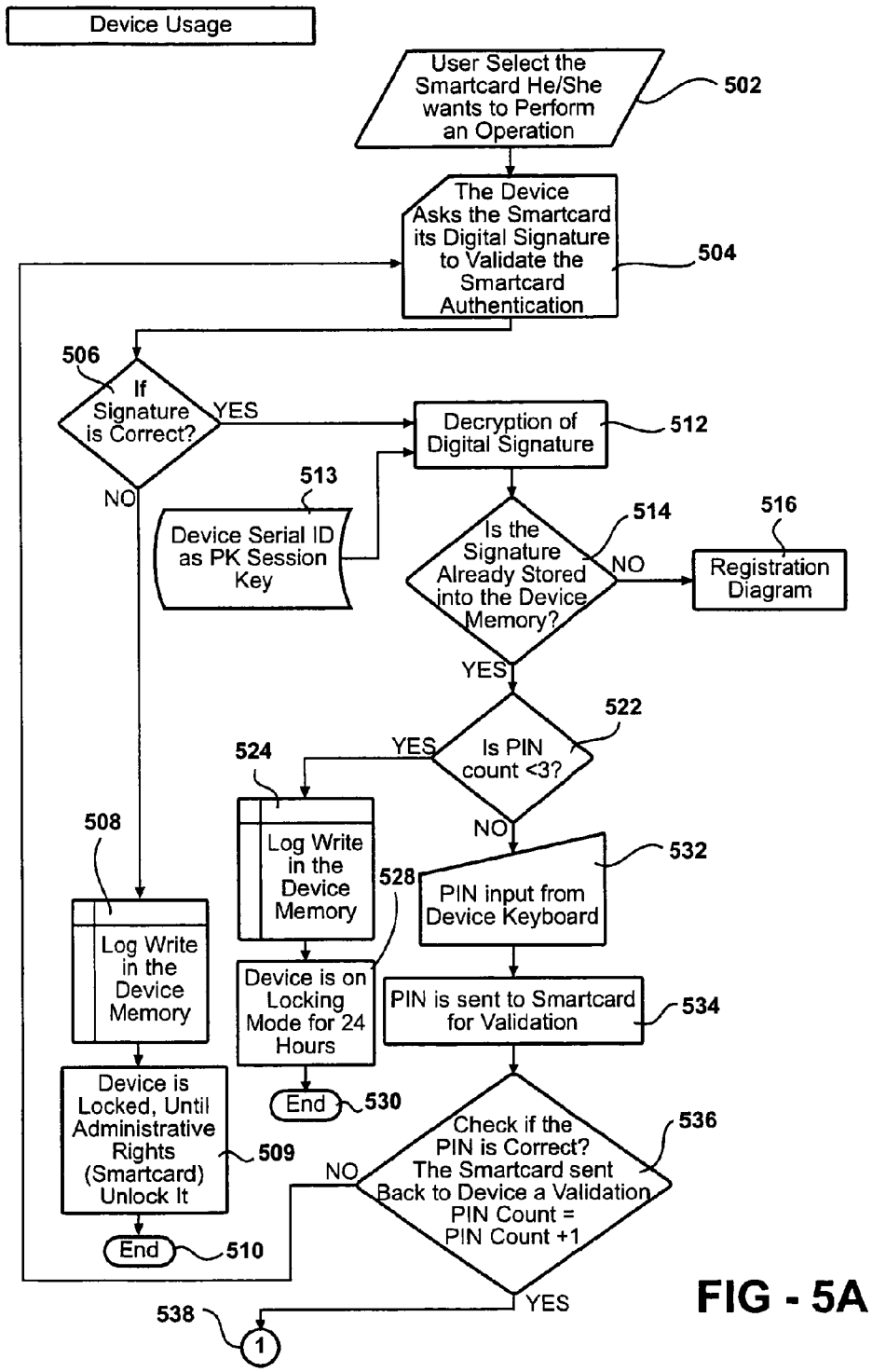
FIG. 5A is the first part of a flow diagram used to illustrate the way in the authentication unit is used, to an exemplary embodiment of the present invention.
Figure 5B:
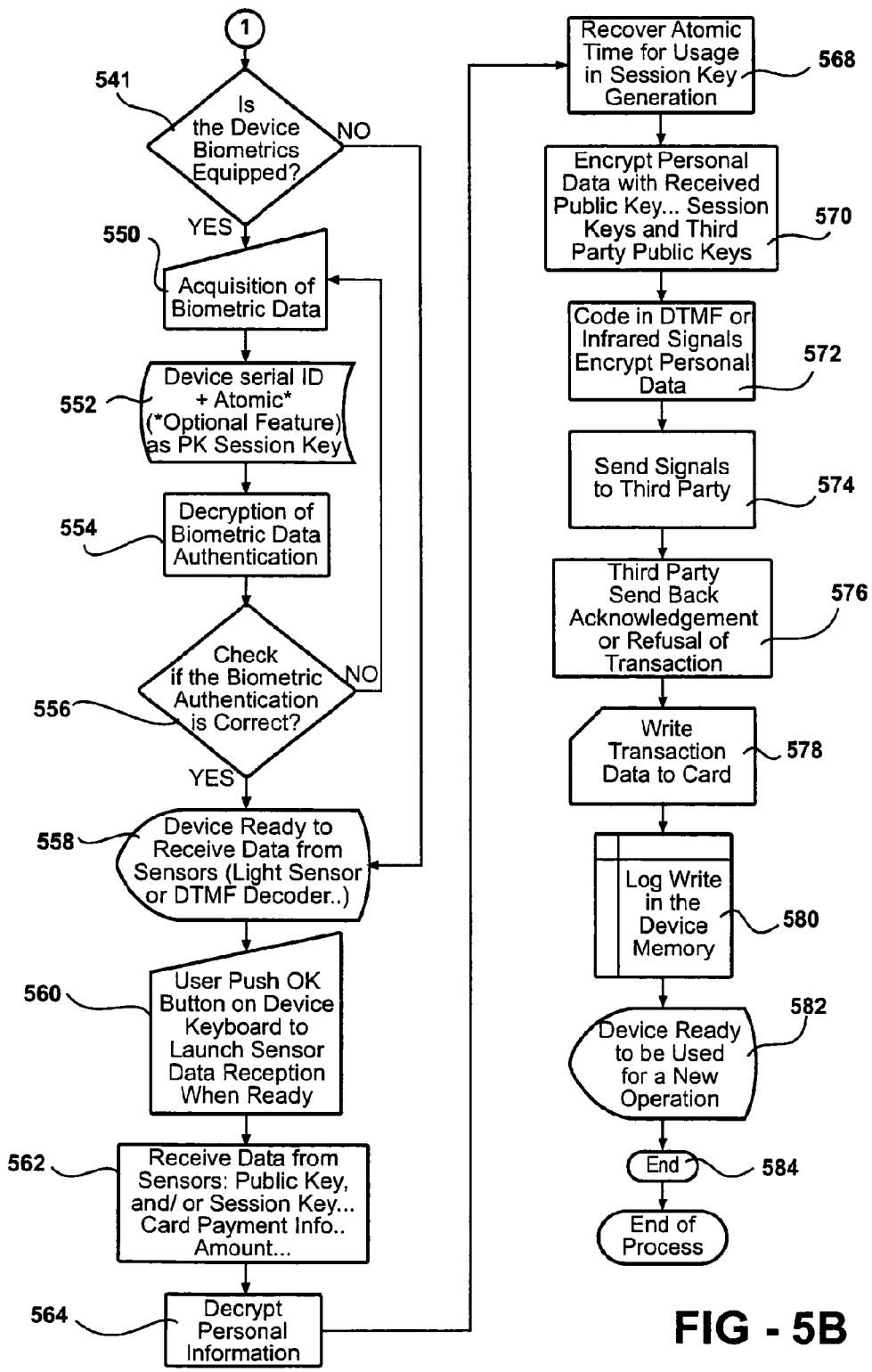
FIG. 5B is a flow diagram illustrating the remaining functional steps of the usage process, according to an exemplary embodiment of the present invention.

FIG. 5A is the first part of a flow diagram used to illustrate the exemplary way in the authentication unit is used according to the present invention. FIG. 5B is a flow diagram illustrating the remaining functional steps of the usage process. The sequence begins at 502, with a user selecting the smartcard intended for use. At 504, an interrogation is made by the authentication unit to determine whether the digital signature is valid to permit authentication. If the signature is correct, at 506, encryption of the digital signature occurs at 512 using the authentication unit serial ID as a session key (513). If the signature is not correct, an entry log is made into the memory of the authentication unit at 508, and the authentication unit is locked until administrative personnel unlock the authentication unit, and the process terminates at 510.

At 514, a query is made to determine if the encrypted signature is already stored in the memory of the authentication unit. If not, control passes to block 516, awaiting the registration process described with reference to FIGS. 4A and 4B. If the signature has been stored, and the temp set PIN entry are sufficiently low at 522 a PIN is received from the keyboard at 532. If the number of PIN entries is too high, however, a log is made in the memory of the authentication unit at 524, an operation is locked for a determined period of time such as 24 hours at 528 and the process ends at 530.

Once the PIN is input from the keyboard at 532, it is sent to the smartcard for verification at 534. At 536, a check is made to determine whether a PIN is made. If not, the process essentially starts over at block 504. If the PIN is correct, however, control passes to point 538 and onto block 540 where a test is made to determine whether the authentication unit is biometrics equipped. If so, the biometrics data are acquired at 550. Optionally, at 552, the authentication unit serial ID and atomic time are used as a session key. The biometric data are decrypted at 554, and a test is made at 556 to determine whether the authentication should proceed based upon the decrypted biometric data. If not, the control resumes at 550 with the acquisition of further biometric data, as necessary.

If the biometric data are valid, however, the authentication unit is ready to receive data from the light sensor or DTMF decoder at 558. The user initiates the process using the keyboard on the authentication unit at 560 to accept sensor data when ready. At 562, the data is received from the sensors, public key and/or session key, including the card information, payment terms, amount of transaction, and so forth.

At 564, personal identification is decrypted and atomic time is recovered at 566 for usage in generating a session key. Personal data are encrypted when received at 570, along with public key, session keys, and third-party public keys. At 572, a code in DTMF of infrared signals is used to encrypt the personal data which is sent to the third-party at 574. The third-party sends back an acknowledgement or refusal of the transaction at 576 and the transaction is recorded on the smartcard 578. A log is made in the memory of the authentication unit at 580, and the authentication unit is ready for use in a new operation at 582. The session terminates at 584.

Figure 6B:
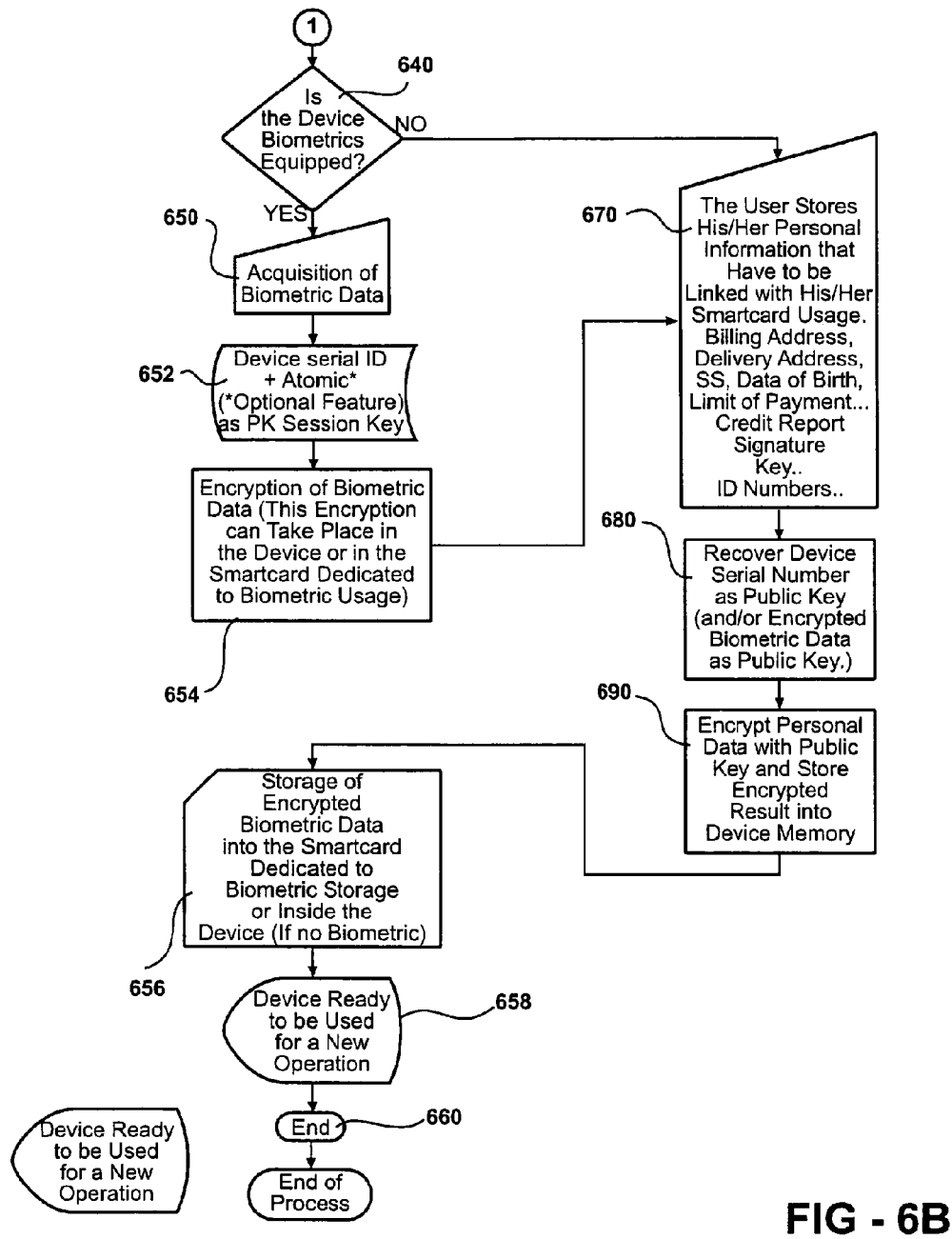
FIG. 6B is a flow diagram which continues the personal data modification process, according to an exemplary embodiment of the present invention.

FIG. 6A is a flow diagram which illustrates an exemplary process associated with personal data modification utilizing the authentication unit according to the present invention. The modification process continues in the flowchart of FIG. 6B. The process begins at 602 with the user selection of the smartcard. At 604, the authentication unit interrogates the smartcard digital signature to validate authentication (604). If the signature is correct (606), encryption of the digital signature occurs at 616, with the authentication unit serial ID being used to generate a session key (613). If the signature is not correct, however, an entry is logged in the memory of the authentication unit at 608, and the authentication unit is locked until administrative personnel are called upon to unlock it at 609, and the process terminates at 610.

Assuming the digital signature has passed through encryption at 616, storage of the smartcard encrypted digital signature in the authentication unit and history log occurs at 620. At 622, it is asked whether the personal identification number (PIN) has only been attempted once or a few numbers of times. If entry is attempted more than a predetermined number of times, such as three or more, a log is made in the authentication unit at 624 and it is locked for a predetermined period of time, such as 24 hours at 628. The process terminates at 630. If only one or a few attempts have been made at PIN entry, the pin is entered from the keyboard at 632, and sent to the smartcard for validation at 634. At 636, a test is made to determine if the PIN is correct. If not, the above process essentially repeats, with control being returned to block 604. Assuming, however, the correct pin has been entered, the question is asked at 640 as to whether the authentication unit is biometrics equipped. If so, the biometric data are acquired at 650. If not, the user may store personal identification which will be linked to smartcard usage, including billing address, delivery address, social security, date of birth, limit of payment, credit report, signature, and so forth at 670. The authentication unit recovers the serial number for use in generating a public key (and/or encrypted biometric data) at 680. At 690, the personal data are encrypted along with public key information, and the result is stored into the memory of the authentication unit.

The encrypted biometric data are also stored in the smartcard and/or inside the authentication unit if no biometric data are available at 656. At 658, the authentication unit is ready to be used for a new operation, and the process ends at 660.

The present invention is not limited in terms of usage, and is therefore applicable to at least the following types of transactions: ID including passports, Identity cards, medical, corporate, and social security; storage of personal and historical medical events or important medical data; electronic vote based on smartcard technology; TV satellite, cable ordering, payment, any media (TV computer, DVD, VHS, streaming video, or audio . . . ) advertising payments; internet transactions and authentications, computer authentication and transactions; specific Web application that need authentication (email authentication, or bank authentication transaction); authentication based on data usage or rules (policy) (copyrighted material music, DVD, files, movies, streaming . . . ); public and/or private utilities services such as telephone invoicing, electricity invoicing, water invoicing, gas invoicing, retail outlet gas stations; security authentication access (governmental institutions . . . ), hotel industry, entertainment including movies theatres, music/music events, entertainment parks, private and/or gated community, airlines industry (airplane ticket), highway toll, healthcare industry, parking payment. car rental, rental, metro ticket; door opener (home, car), physical security, home security, car security; payment in a physical retail location; ATM cash transaction, (in this case the ATM machine does not need to have any keyboard . . . ); software applications or games usage authentication; OS usage authentication; lotto, or gaming (casino . . . ) applications based on the payment and the storage of possible personal data; payment on automated machine such as beverage/candy/food machine; Prepaid debit/credit card for micro payment; the use of a debit/credit card as a phone card. In addition, the authentication unit may further be interconnected to existing accounting software, to memorize the history of card usage and send detailed and itemized balance on all payment collected via software or by phone.

This authentication unit can also return funds to the smartcard holder and notify the bank. This authentication unit also caches authorization storage based on pre-approved amount link to the amount allowing users, to make multiple purchase based on one single authorization code, providing full payment guaranteed to the merchant. This authentication unit will allow multiple credit card issuers, and handle multiple authorizations as well. It further permits complete decentralization of credit report, allowing the authentication unit to maintain his/her own credit report with respect to usage privacy. This credit report can be sent only with the approval of the smartcard payment, credit card owner to third party during payment or identification process if the third party so requests. The credit reporting company may also obtain a full encrypted copy of this report, and also stores it in encrypted form on their own servers for verification and services purposes.

In an exemplary embodiment, the present invention provides a system for securing a transaction. The system comprises: an authentication unit capable of processing an input, the authentication unit is capable of generating a dynamic card transaction code valid for a single transaction; and a RFID generator capable of generating at least a dynamic RFID key for a predefined limited time period by using the dynamic card transaction code for the single transaction. The authentication of the input is performed locally with the authentication unit through an encrypted and unique RIFD communication between the authentication unit and a third party by using a challenge response protocol. The authentication unit is having a transponder which is capable of communicating with the third party using a preset frequency and a challenge response protocol.

In an exemplary embodiment of the present invention, the input includes at least any one of: biometric characteristics physically representing the user, a magnetic card, a smart card, a credit card, a debit card, a master card, a contactless smart card including a RFID card, a card template, a biometric template, a password, SID, a signature, personal identification number (PIN), complete identification, picture, movie, music, video, personal preferences, payment information, shipping information, billing information, medical records, insurance information, travel documents, forms of identification, wherein the biometric characteristics include fingerprint, veins, palm, voice, eyes, voice print, and card holder's iris scan.

In an exemplary embodiment of the present invention, the authentication unit is capable of storing and registering the input during a preliminary setup and pre-registration process before usage, the authentication unit capable of generating the dynamic card transaction code according to the stored and registered inputs. The RFID generator is coupled internally with the authentication unit which is capable of preventing Radio Frequency to heat-up the RFID generator directly.

In an exemplary embodiment of the present invention, the authentication unit is capable of communicating an ID code of the transaction to the third party through the RFID generator upon validation of the transaction. The communication subsequent to the validation of the input are encrypted using one of public-key cryptography, and Identity-Based-Encryption (IBE) cryptography.

In an exemplary embodiment of the present invention, the third party includes at least any one of: point of sale (POS), ATM, a server, wherein the third party is connected with the authentication unit through a network, wherein the network includes public network, private network, shared network, Internet, Intranet, LAN, WAN. The authentication unit is capable of communicating the dynamic RFID key to a third party for validating the transaction by using a challenge response protocol.

In an exemplary embodiment, the wherein a GPS with embedded atomic clock to verify the accurate time of the transaction with the third party, is connected with the authentication unit through the network.

In an exemplary embodiment of the present invention, the authentication unit includes at least any one of: a portable smartcards reader, a biometric reader capable of reading the biometric information stored into a smartcard, USB key, at least a biometric characteristics sensor for sensing biometric characteristics of the user locally with the authentication unit, a storage unit for storing the input.

In an exemplary embodiment of the present invention, the biometric characteristics sensor includes at least any one of: a fingerprint sensor to acquire a fingerprint of the user, a microphone to acquire a voice of the user, a vein sensor for sensing the veins of the user, a palm sensor for sensing the palm of the user, a face detection sensor for detecting eyes and iris of the user.

In an exemplary embodiment of the present invention, the authentication unit is capable of working alone and as a plug-in with at least any one of a personal digital assistant (PDA), a hand-held remote control, a cellular telephone, a fax machine, and a printer is used for securing the transaction.

In an exemplary embodiment of the present invention, the authenticating unit includes an inbuilt central-processing unit for transaction management and input-output capability for reading and writing information to a plurality of cards including magnetic cards, optical cards, and smart cards, wherein the smart cards includes EPROM cards, random-access memory (RAM) cards, and read-on memory (ROM) cards and RFID cards In an exemplary embodiment of the present invention, the transaction is authenticated locally at the authentication unit with the third party by using at least one of the dynamic RFID key, the dynamic card transaction code, and a challenge response protocol.

In an exemplary embodiment of the present invention, the private key generator (PKG) is capable of using the biometric characteristics as a master private key and the time information is used as a public key. The public key included but not limited to any one of: an Identity-Based-Encryption (IBE), a pairing-based encryption, and a quadratic residues encryption scheme.

In an exemplary embodiment of the present invention, the authentication unit is capable of securing: voting by permitting a right voter to vote and refusing a wrong voter, access control, airport security checkpoint, buying goods via the Internet, in a department store, credit card transactions and billings.

Figure 7:
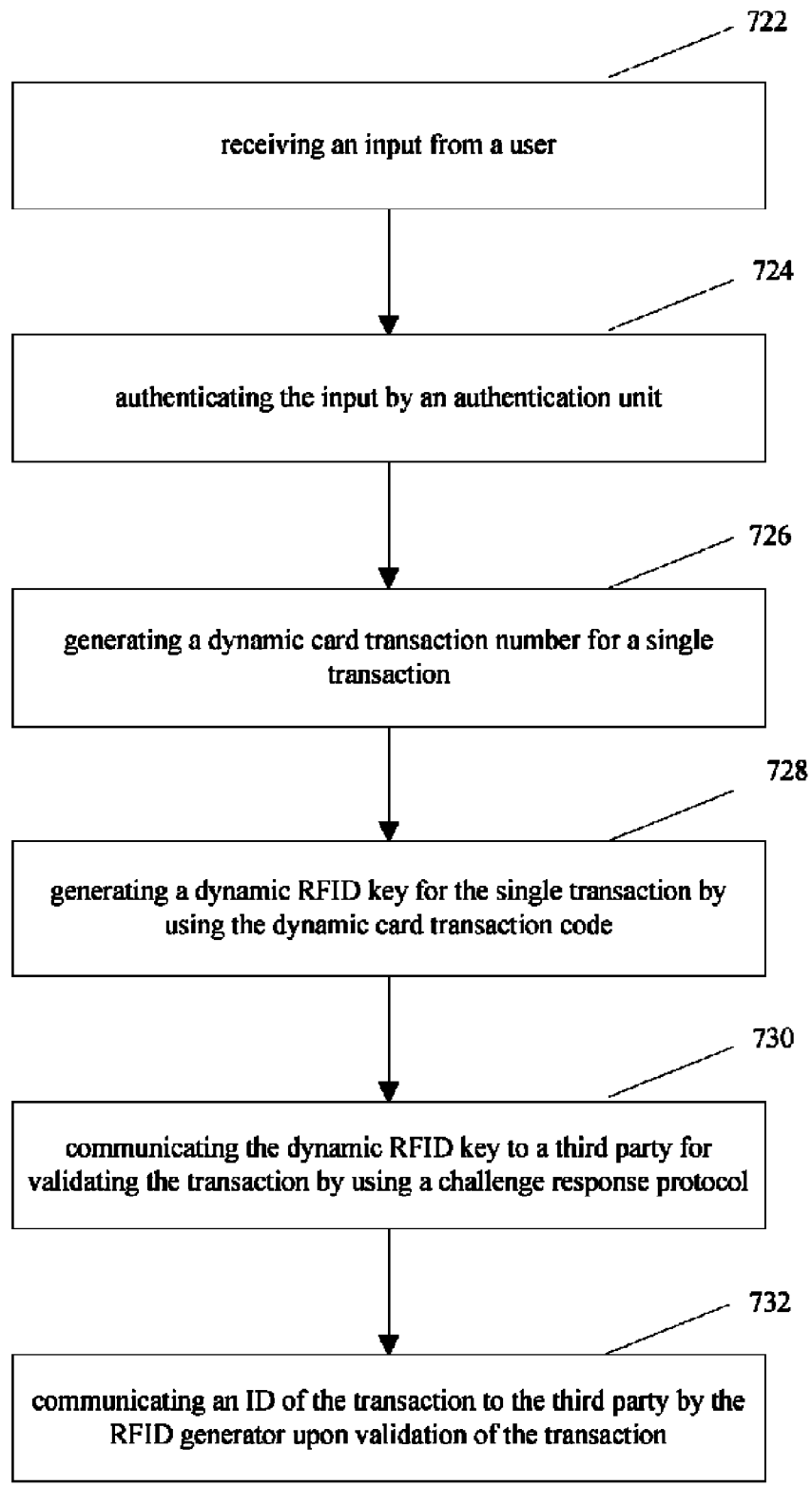
FIG. 7 is a flow diagram which illustrates a method for securing a transaction, according to an exemplary embodiment of the present invention.

Referring to FIG. 7 which is a flow diagram illustrating a method for securing a transaction, according to an exemplary embodiment of the present invention. At steps 722, the authentication unit receives an input from a user and at steps 722 the authentication unit perform authentication of the input by pairing the input stored in the authentication unit with the input extracted from the user. At step 726, a dynamic card transaction code is generated for a single transaction upon authentication of the input. At step 728, a dynamic RFID key for the single transaction is generated by using the dynamic card transaction code. At step 730, the dynamic RFID key is communicated to a third party for validating a transaction by using a challenge response protocol. At step 732, an ID code of the transaction is communicated to the third party by the RFID generator upon validation of the transaction. The transaction is authenticated locally with the authentication unit with the third party by using at least one of the dynamic RFID key, the dynamic card transaction code, and a challenge response protocol.

Figure 8:
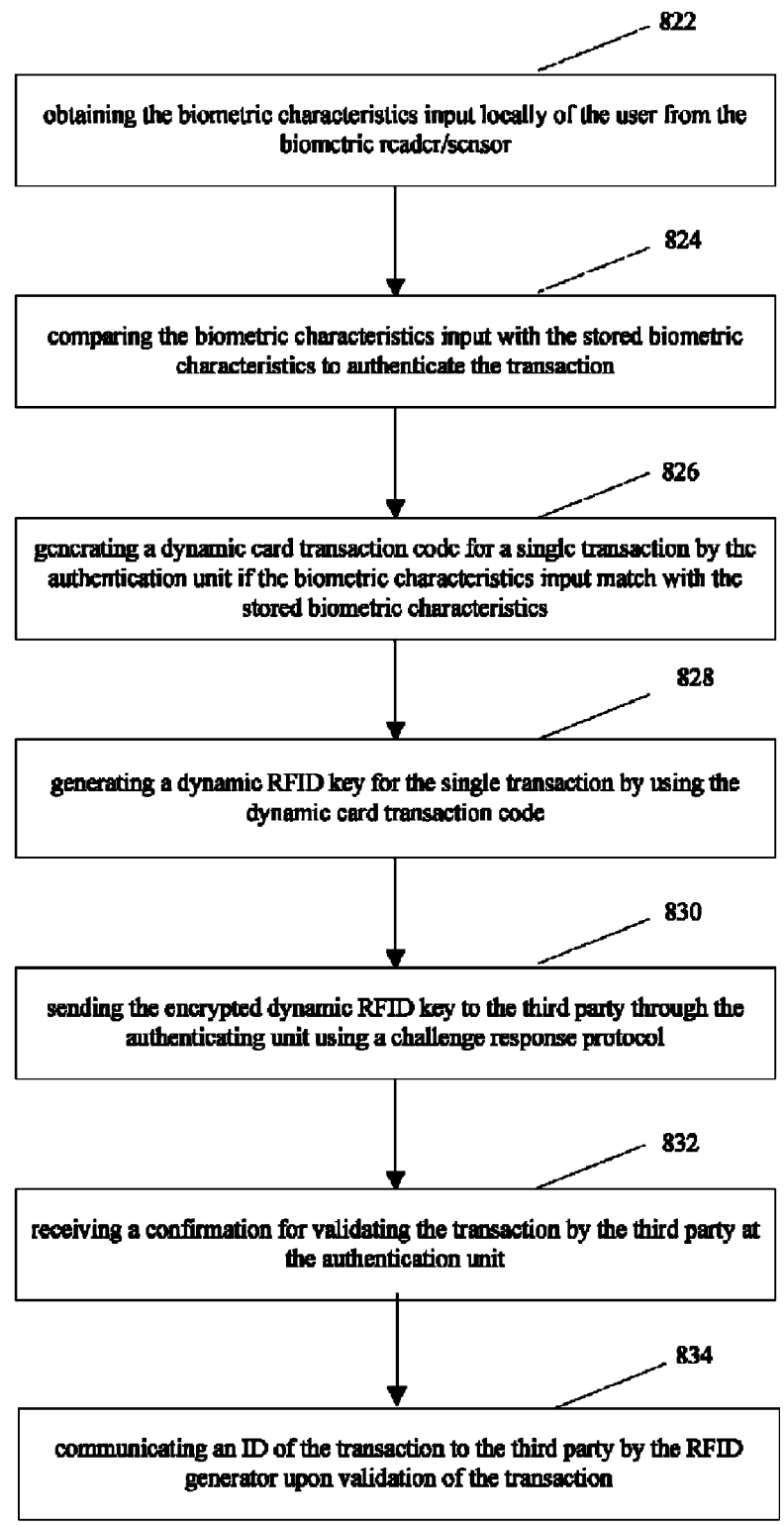
FIG. 8 is a flow diagram which illustrates a method for securing a transaction, according to an exemplary embodiment of the present invention.

Referring to FIG. 8, which is a flow diagram illustrating a method for securing a transaction, according to an exemplary embodiment of the present invention. The method comprises the steps of: obtaining the biometric characteristics input locally with the authentication unit of the user from the biometric reader and sensor at step 822, comparing the biometric characteristics input with the stored biometric characteristics to authenticate a transaction at step 824, generating a dynamic card transaction code for a single transaction by the authentication unit if the biometric characteristics input match with the stored biometric characteristics at step 826, generating a dynamic RFID key for the single transaction by using the dynamic card transaction code at step 828, sending the encrypted dynamic RFID key to the third party through the authenticating unit using a challenge response protocol at step 830, receiving a confirmation for validating the transaction by the third party at the authentication unit at a step 832, and communicating an ID of the transaction to the third party by the RFID generator upon validation of the transaction at step 834. The atomic time is used as a serialization and challenge response protocol variable.

In an exemplary embodiment of the present invention, the RFID will support active RFID, passive RFID tags, passive (BAP), by removing the storage limitation link to RFID due to emulation and using the storage of the authentication unit itself, thus permit exchange of large amount of data, if necessary, including but not limited to complete identification, picture, movie, music, personal preferences, payment information.

In an exemplary embodiment of the present invention, the authentication unit card reader is not involved during the encryption process but the smart card is involved in the encryption process. The present invention also provides access control apparatus to prevent entering a particular location where no entry is permitted to the unauthorized visitor.

According to an exemplary embodiment of the present invention, that a generic smart card may be created to copy card holder's own credit card specifically from one transaction or for one person or for one amount, for example, several purchases up to a limited amount, from the card holder's American Express Card or any others card such as Visa Master Card etc.

As an alternative to the use of a separate or independent display (CRT or LCD) and keyboard, the plug-in of FIG. 7 may be used. The device is essentially a handset including a smartcard reader, preferably with 2 biometric sensors, one for the voice and the other one for the fingerprint. This is a highly secured device, including a time stamped Private Key that is generally locally and linked to the biometric information. The smartcard used may be a payment card or any service card (i.e., SIM or 7816 size). Up to 5 or more smartcard may be read simultaneously.

Figure 9:
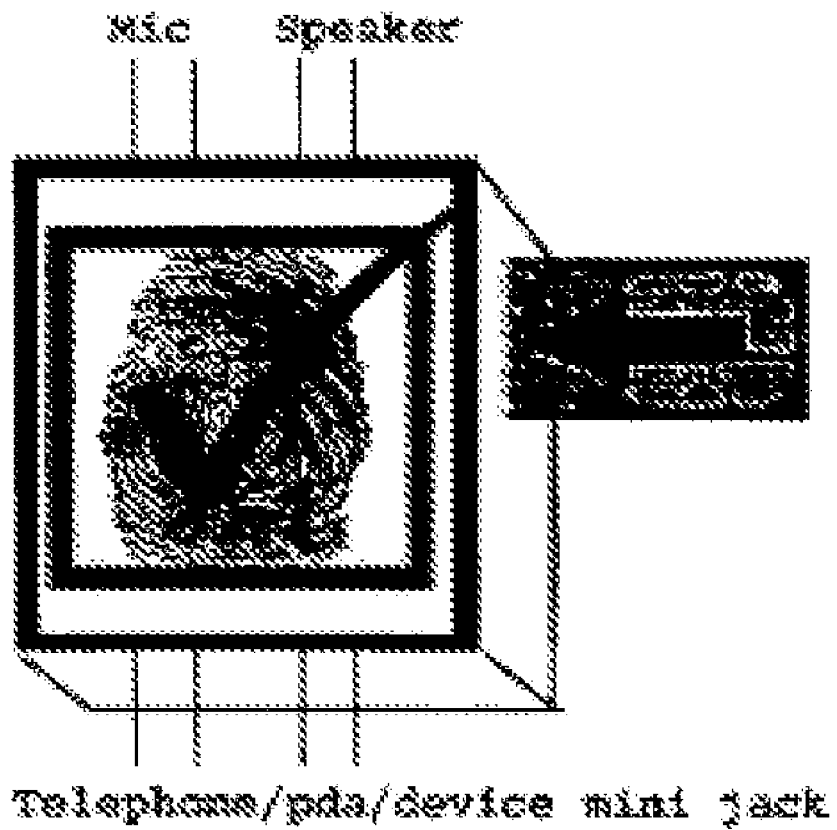
FIG. 9 illustrates an authentication unit including one or more biometric inputs, attachable to a plurality of communication devices including a PDA, portable phone, and other device, according to an exemplary embodiment of the present invention.

Referring to FIG. 9, which illustrates an authentication unit including one or more biometric inputs, attachable to a plurality of communication devices including a PDA, portable phone, and other device, according to an exemplary embodiment of the present invention. The authentication unit or biometric handset includes a (cryptographic) processor to perform elliptic curves and random number generator. A dedicated ASIC/DSP sends and receives the DTMF/FSK signals. In addition to other advantages, the system can deliver a vocal instruction to the handset and receive the voice as a second biometric identification from the microphone of the headset. The device is battery operated with a backup. Other features include an atomic time clock and software that can be updated by way of a smartcard (SIM or 7816 size) javacard or DTMF/FSK. The amount of memory is optional. Policy (in encrypted XML) considerations may also be stored on the smartcard. When the handset is attached, the associated PDA, computer, or phone keyboard sends DTMF signals which are recognized by the device. PDA or phone screen can be updated thru a WAP application link to a vocal server. This system takes advantage of Identity-based Encryption (IBE) utilizing biometric usage and times tamping technology. At least four algorithms may be used: (1) Setup—A user, "Bob," generates sys-params and master key. To initialize an IBE security, a key generator picks an elliptic curve, a secret S and a point P on the curve using a random number generator. The secret S is the biometric data so nothing can compromise the system; (2) Encrypt—The sender, Alice, during handshaking receive from bob the public parameters, P and S.circle-solid.P, (the product of bob's S and P), Bob's identity (this might, for example, be the "phone number"+T where T is the key expiration). Alice, to encrypt a message to Bob, first hashes Bob's identity to a point on the elliptic curve IDBob. She then picks a random r and calculates a key k where k=Pair (R.circle-solid.IDBob, S.circle-solid.P). Alice then sends to Bob Ek[Message], the message encrypted with k. She also sends him the product R.circle-solid.P; (3) Key Generation—When Bob receives the message, retrieve s from bob biometric data, recover and compare T locally (key expiration stored during handshaking) and calculates S.circle-solid.IDBob and this value is his private key; and (4) Decrypt—After receiving the message and a key, Bob can recover the key k by calculating: k=Pair (S.circle-solid.IDBob, R.circle-solid.P) which, because of the properties of bilinear maps, is the same as the key Alice used to encrypt the message: k=Pair (R.circle-solid.IDBob, S.circle-solid.P). Using k, Bob decrypts the message. As Bob is the only person with this private key (biometric), S.circle-solid.IDBob, no one else can calculate k. T=key expiration calculated from the (atomic) times-tamped clock.

With reference to specific embodiments, the description is illustrative of the present invention and is not to be construed as limiting the present invention. Various modifications to the present invention can be made to the exemplary embodiments by those skilled in the art without departing from the true spirit and scope of the present invention as defined by the appended claims.

What is claimed is:

1. A system for securing a transaction, comprising:
    an authentication unit capable of processing an input, the authentication unit is capable of generating a dynamic card transaction code valid for a single transaction; and
    a RFID generator capable of generating at least a dynamic RFID key for a predefined limited time period by using the dynamic card transaction code for the single transaction,
    wherein the authentication of the input is performed locally with the authentication unit through an encrypted and unique RFID communication between the authentication unit and a third party by using a challenge response protocol.

2. The system of claim 1, wherein the authentication unit is having a transponder which is capable of communicating with the third party using a desired present range of frequencies and the challenge response protocol.

3. The system of claim 1, wherein the input includes at least any one of: biometric characteristics physically representing the user, non-biometric characteristics, a magnetic card, a smart card, a credit card, a debit card, a master card, a contactless smart card including a RFID card, a card template, a biometric template, a password, SID, a signature, personal identification number (PIN), complete identification, picture, movie, music, video, personal preferences, payment information, shipping information, billing information, medical records, insurance information, travel documents, forms of identification, wherein the biometric characteristics include but not limited to fingerprint, veins, palm, voice, eyes, voice print, and card holder's iris scan.

4. The system of claim 1, wherein the authentication unit is capable of registering and storing the input during a preliminary setup and pre-registration process before usage, the authentication unit capable of generating the dynamic card transaction code according to the stored and registered inputs.

5. The system of claim 1, wherein the RFID generator is coupled internally with the authentication unit which is capable of preventing Radio Frequency to heat-up the RFID generator directly.

6. The system of claim 1, wherein the authentication unit is capable of communicating an ID code of the transaction to the third party through the RFID generator upon validation of the transaction.

7. The system of claim 1, wherein the communication subsequent to the validation of the input are encrypted using one of public-key cryptography, and Identity-Based-Encryption (IBE) cryptography.

8. The system of claim 1, wherein the third party includes at least any one of: point of sale (POS), ATM, a server, wherein the third party is connected with the authentication unit through a network, wherein the network includes public network, private network, shared network, Internet, Intranet, LAN, WAN, wired network, and wireless network, transmission lines.

9. The system of claim 1, wherein the authentication unit is capable of communicating the dynamic RFID key to a third party for validating the transaction by using the challenge response protocol.

10. The system of claim 1, a GPS [Global positioning system with embedded atomic clock] to verify the accurate time of the transaction with the third party, is connected with the authentication unit through the network.

11. The system of claim 1, wherein the authentication unit includes at least any one of: a portable smartcards reader, a mobile smart card reader, a biometric reader capable of reading the biometric information stored into a smartcard, a USB key, a biometric characteristic reader for reading the biometric characteristic of the user, at least a biometric characteristics sensor for sensing biometric characteristics of the user locally with the authentication unit, a storage unit for storing the input.

12. The system of claim 11, wherein the biometric characteristics sensor includes at least any one of: a fingerprint sensor to acquire a fingerprint of the user, a microphone to acquire a voice of the user, a vein sensor for sensing the veins of the user, a palm sensor for sensing the palm of the user, a face detection sensor for detecting eyes, iris, and any body identity feature of the user.

13. The system of claim 1, wherein any one of a personal digital assistant (PDA), a hand-held remote control, a wireless phone, wired phone, cellular mobile telephone, a head set, a fax machine, and a printer is used for securing a transaction.

14. The system of claim 1, wherein the authenticating unit includes an inbuilt central-processing unit for transaction management and input-output capability for reading and writing information to a plurality of cards including magnetic cards, optical cards, and smart cards, wherein the smart cards includes EPROM cards, random-access memory (RAM) cards, and read-on memory (ROM) cards, and contactless cards.

15. The system of claim 14, wherein the public key includes at least any one of: an Identity-Based-Encryption (IBE), a pairing-based encryption, and a quadratic residues encryption scheme.

16. The system of claim 1, wherein the transaction is authenticated locally with the authentication unit with the third party by using at least one of the dynamic RFID key, the dynamic card transaction code, and the challenge response protocol, generic card code, virtual card code.

17. The system of claim 1, wherein a private key generator (PKG) is capable of using the biometric characteristics as a master private key.

18. The system of claim 1, wherein time information is used as a public key.

19. The system of claim 1, wherein the authentication unit is capable of securing: voting by permitting a right voter to vote and refusing a wrong voter, access control, airport security checkpoint, buying goods via the Internet, in a department store, credit card transactions and billings.

20. A method for securing a transaction, comprising the steps of:
    receiving an input from a user;
    authenticating the input by an authentication unit, wherein the input is authenticated by pairing the input stored in the authentication unit with the input extracted from the user;
    generating a dynamic card transaction code for a single transaction upon authentication of the input;
    generating a dynamic RFID key for the single transaction by using the dynamic card transaction code;
    communicating the dynamic RFID key to a third party for validating the transaction by using a challenge response protocol; and
    communicating an ID of the transaction to the third party by the RFID generator upon validation of the transaction,
    wherein the transaction is authenticated locally by the authentication unit with the third party by using at least one of the dynamic RFID key, the dynamic card transaction code, and the challenge response protocol.

21. The method of claim 20, wherein the authentication unit is having a transponder which is capable of communicating with the third party using a preset frequency and a challenge response protocol.

22. The method of claim 20, wherein the input includes at least any one of: biometric characteristics physically representing the user, a magnetic card, a smart card, a credit card, a debit card, a master card, a RFID card, a card template, a PIN, a password, SID, a signature, personal identification numbers, complete identification, picture, movie, music, video, personal preferences, payment information, shipping information, billing information, medical records, insurance information, travel documents, forms of identification, wherein the biometric characteristics include fingerprint, veins, palm, voice, eyes, voice print, and card holder's iris scan.

23. The method of claim 20, wherein the authentication unit is capable of registering and the input during a preliminary setup and pre-registration process before usage, the authentication unit capable of generating the dynamic card transaction code according to the stored and registered inputs.

24. The method of claim 20, wherein the RFID generator is coupled internally with the authentication unit which is capable of preventing Radio Frequency to heat-up the RFID generator directly.

25. The method of claim 20, wherein the authentication unit is capable of communicating an ID of the transaction to the third party through the RFID generator upon validation of the transaction.

26. The method of claim 20, wherein the communication subsequent to the validation of the input are encrypted using one of public-key cryptography, and identity-based encryption (IBE) cryptography.

27. The method of claim 20, wherein the third party includes at least any one of: point of sale (POS), ATM, a server, wherein the third party is connected with the authentication unit through a network, wherein the network includes public network, private network, shared network, Internet, Intranet, LAN, WAN.

28. The method of claim 20, wherein the authentication unit is capable of communicating the dynamic RFID key to a third party for validating the transaction by using a challenge response protocol.

29. The method of claim 20, a GPS with embedded atomic clock to verify the accurate time of the transaction with the third party, is connected with the authentication unit through the network.

30. The method of claim 20, wherein the authentication unit includes at least any one of: a portable smartcards reader, a biometric reader capable of reading the biometric information stored into a smartcard, USB key, at least a biometric characteristics sensor for sensing biometric characteristics of the user locally with the authentication unit, a storage unit for storing the input.

31. The system of claim 30, wherein the biometric characteristics sensor includes at least any one of: a fingerprint sensor to acquire a fingerprint of the user, a microphone to acquire a voice of the user, a vein sensor for sensing the veins of the user, a palm sensor for sensing the palm of the user, a face detection sensor for detecting eyes and iris of the user.

32. The method of claim 20, wherein any one of a personal digital assistant (PDA), a hand-held remote control, a cellular telephone, a fax machine, and a printer is used for securing the transaction.

33. The method of claim 20, wherein the authenticating unit includes an inbuilt central-processing unit for transaction management and input-output capability for reading and writing information to a plurality of cards including magnetic cards, optical cards, and smart cards, wherein the smart cards includes EPROM cards, random-access memory (RAM) cards, and read-on memory (ROM) cards.

34. The method of claim 20, wherein the transaction is authenticated locally at the authentication unit with the third party by using at least one of the dynamic RFID key, the dynamic card transaction code, and a challenge response protocol.

35. The method of claim 20, wherein a private key generator (PKG) is capable of using the biometric characteristics as a master private key.

36. The method of claim 20, wherein time information is used as a public key.

37. The system of claim 36, wherein the public key includes at least anyone of: an Identity-Based-Encryption (IBE), a pairing based encryption, and a quadratic residues encryption scheme.

38. The method of claim 20, wherein the authentication unit is capable of securing: voting by permitting a right voter to vote and refusing a wrong voter, airport security checkpoint, buying goods via the Internet, in a department store, credit card transactions and billings.

39. The method of claim 20, wherein a private key generator (PKG) is capable of using the biometric information as a master private key.

40. A method of authenticating a transaction, comprising the steps of:
obtaining the biometric characteristics input locally with the authentication unit of the user from the biometric reader sensor;
comparing the biometric characteristics and templates input with the stored biometric characteristics and templates to authenticate the transaction;
generating a dynamic card transaction code for a single transaction by the authentication unit if the biometric characteristics input match with the stored biometric characteristics;
generating a dynamic RFID key for the single transaction by using the dynamic card transaction code;
sending the encrypted dynamic RFID key to the third party through the authenticating unit using a challenge response protocol, wherein the atomic time is used as a serialization and challenge response protocol variable;
receiving a confirmation for validating the transaction by the third party at the authentication unit; and
communicating an ID of the transaction to the third party by the RFID generator upon validation of the transaction.

* * * * *